(12) United States Patent
Ueno et al.

(10) Patent No.: US 11,220,764 B2
(45) Date of Patent: *Jan. 11, 2022

(54) STRETCHABLE SHEET AND METHOD FOR PRODUCING THE SAME

(71) Applicant: Toray Industries, Inc., Tokyo (JP)

(72) Inventors: Masaru Ueno, Gifu (JP); Yasuhiro Ishikura, Otsu (JP); Takaaki Taguchi, Gifu (JP)

(73) Assignee: TORAY INDUSTRIES, INC., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/919,197

(22) Filed: Jul. 2, 2020

(65) Prior Publication Data

US 2020/0332443 A1 Oct. 22, 2020

Related U.S. Application Data

(62) Division of application No. 12/531,817, filed as application No. PCT/JP2008/054574 on Mar. 13, 2008, now Pat. No. 10,745,830.

(30) Foreign Application Priority Data

Mar. 19, 2007 (JP) .................................. 2007-070327

(51) Int. Cl.
*D01F 8/14* (2006.01)
*C08G 18/42* (2006.01)
(Continued)

(52) U.S. Cl.
CPC .................. *D01F 8/14* (2013.01); *B32B 5/26* (2013.01); *C08G 18/4277* (2013.01);
(Continued)

(58) Field of Classification Search
CPC ....... D01F 8/14; C08G 18/44; C08G 18/4277; C08G 18/6674; C08G 18/7671;
(Continued)

(56) References Cited

U.S. PATENT DOCUMENTS 4,604,320 A 8/1986 Okamoto et al.
6,472,442 B1 10/2002 Masubuchi
(Continued)

FOREIGN PATENT DOCUMENTS

CN 1556882 A 12/2004
EP 1536056 A2 6/2005
(Continued)

OTHER PUBLICATIONS

International Search Report and Written Opinion for International Application No. PCT/JP2008/054574, dated Jun. 24, 2008, 6 pages.
(Continued)

*Primary Examiner* — Jeremy R Pierce
(74) *Attorney, Agent, or Firm* — RatnerPrestia

(57) ABSTRACT

A sheet is produced by
(i) producing a sheet by entangling woven or knitted material including a thread composed of a composite fiber such that two kinds or more of polyethylene terephthalate polymers different in intrinsic viscosity are stuck together in a side-by-side type along the fiber length direction and/or of a core-in-sheath type composite fiber such that two kinds or more of polyethylene terephthalate polymers different in intrinsic viscosity form an eccentric core-in-sheath structure, with a fiber capable of converting into ultra fine fibers composed of two kinds or more of polymeric substances different in solubility in solvent,
(ii) developing an ultra fine fiber with an average single fiber fineness of 0.001 dtex or more and 0.5 dtex or less
(Continued)

by treating the sheet with a solvent to thereafter provide elastomer having polyurethane as a main component by impregnating and solidifying solvent solution of elastomer having polyurethane as a main component into the sheet, or of providing elastomer having polyurethane as a main component by impregnating and solidifying solvent solution of elastomer having polyurethane as a main component into the sheet to thereafter develop an ultra fine fiber with an average single fiber fineness of 0.001 dtex or more and 0.5 dtex or less by treating the sheet with a solvent, and (iii) rubbing and shrinking the woven or knitted material under the condition of 110° C. or more.

8 Claims, 1 Drawing Sheet

(51) Int. Cl.
| | | |
|---|---|---|
| *C08G 18/44* | (2006.01) | |
| *D06N 3/14* | (2006.01) | |
| *D04H 1/482* | (2012.01) | |
| *D04H 1/488* | (2012.01) | |
| *D06M 15/564* | (2006.01) | |
| *B32B 5/26* | (2006.01) | |
| *C08G 18/66* | (2006.01) | |
| *D06N 3/00* | (2006.01) | |
| *D04H 1/64* | (2012.01) | |
| *C08G 18/76* | (2006.01) | |
| *C08G 18/48* | (2006.01) | |
| *D04H 1/4382* | (2012.01) | |

(52) U.S. Cl.
CPC .......... *C08G 18/44* (2013.01); *C08G 18/4854* (2013.01); *C08G 18/664* (2013.01); *C08G 18/6674* (2013.01); *C08G 18/7671* (2013.01); *D04H 1/4383* (2020.05); *D04H 1/43828* (2020.05); *D04H 1/43832* (2020.05); *D04H 1/43838* (2020.05); *D04H 1/482* (2013.01); *D04H 1/488* (2013.01); *D04H 1/64* (2013.01); *D06M 15/564* (2013.01); *D06N 3/0002* (2013.01); *D06N 3/0004* (2013.01); *D06N 3/0031* (2013.01); *D06N 3/14* (2013.01); *Y10T 442/2008* (2015.04); *Y10T 442/2861* (2015.04)

(58) Field of Classification Search
CPC .... C08G 18/664; C08G 18/4854; D06N 3/14; D06N 3/0004; D06N 3/0002; D06N 3/0031; B32B 5/26; D04H 1/482; D04H 1/488; D04H 1/64; D04H 1/4382; D06M 15/564; Y10T 442/2008; Y10T 442/2861
See application file for complete search history.

(56) References Cited

U.S. PATENT DOCUMENTS

| | | | |
|---|---|---|---|
| 6,767,853 | B1 | 7/2004 | Nakayama et al. |
| 10,745,830 | B2 * | 8/2020 | Ueno ................... D04H 1/488 |
| 2003/0187140 | A1 | 10/2003 | Lintecum et al. |
| 2004/0015427 | A1 | 1/2004 | Camello |
| 2004/0241346 | A1 | 12/2004 | Hanaoka et al. |
| 2004/0242100 | A1 | 12/2004 | Nobuto et al. |
| 2005/0118394 | A1 | 6/2005 | Tanaka et al. |
| 2007/0151654 | A1 | 7/2007 | Hwang et al. |
| 2007/0197116 | A1 | 8/2007 | Yakake et al. |
| 2008/0173387 | A1 | 7/2008 | Hanaoka et al. |
| 2009/0130371 | A1 | 5/2009 | Horiguchi et al. |
| 2009/0191778 | A1 | 7/2009 | Koshida et al. |

FOREIGN PATENT DOCUMENTS

| | | | |
|---|---|---|---|
| JP | 0380909 | B2 | 12/1991 |
| JP | 11269751 | A | 10/1999 |
| JP | 2000297211 | A | 10/2000 |
| JP | 2000336581 | A | 12/2000 |
| JP | 2004091999 | A | 3/2004 |
| JP | 2006070423 | A | 3/2006 |
| WO | 2005095706 | A1 | 10/2005 |
| WO | 2006013804 | A1 | 2/2006 |
| WO | 2006134965 | A1 | 12/2006 |

OTHER PUBLICATIONS

Entire patent prosecution history of U.S. Appl. No. 12/531,817, filed Sep. 17, 2009, entitled, "Stretchable Sheet and Method for Producing the Same."

* cited by examiner

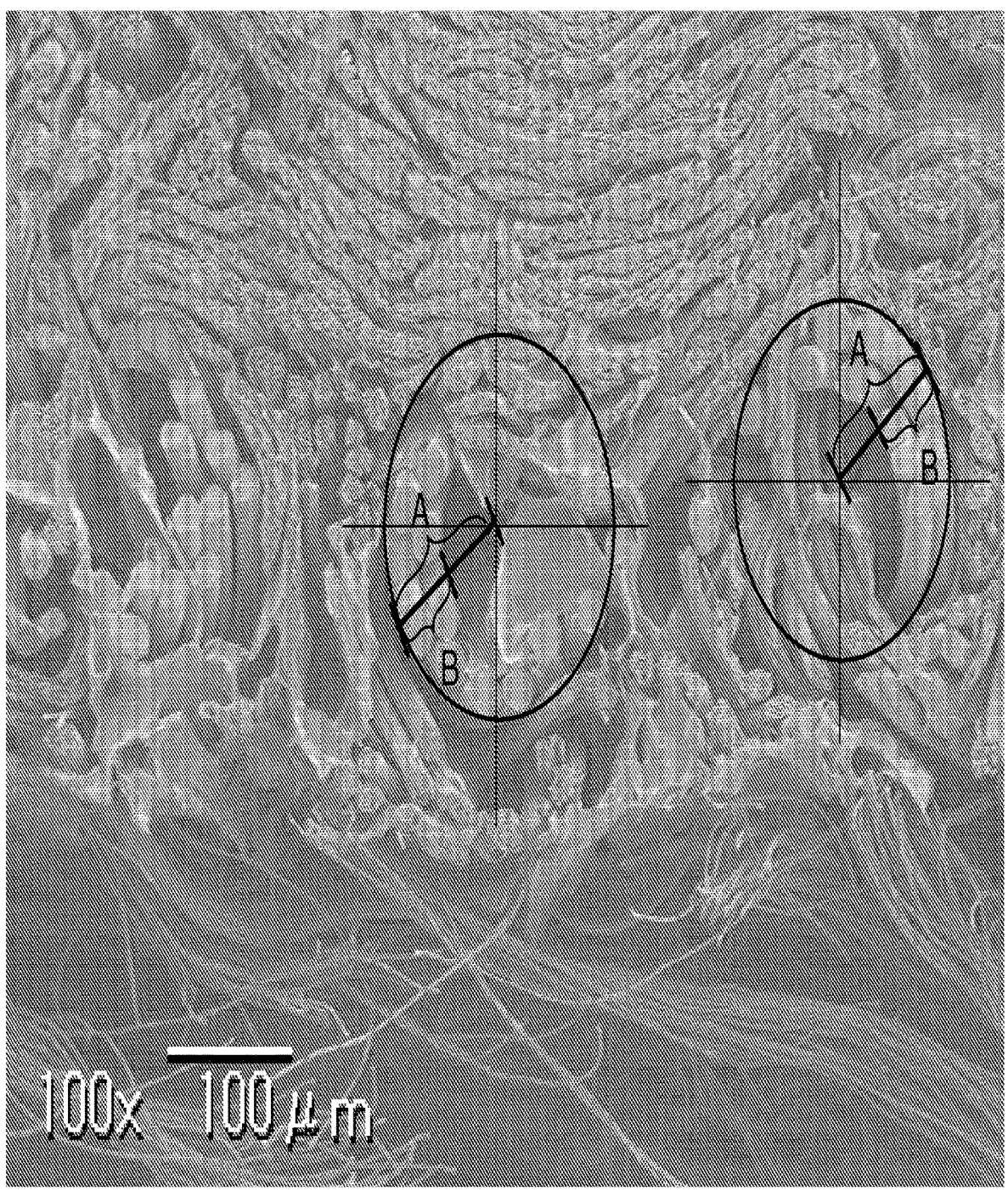

US 11,220,764 B2

STRETCHABLE SHEET AND METHOD FOR PRODUCING THE SAME

CROSS REFERENCE TO RELATED APPLICATIONS

This is a Divisional Application of application Ser. No. 12/531,817, filed Sep. 17, 2009, which is the U.S. National Phase Application of PCT/JP2008/054574, filed Mar. 13, 2008, which claims priority to Japanese Application No. 2007-070327 filed on Mar. 19, 2007.

FIELD OF THE INVENTION

The present invention relates to a sheet excellent in surface appearances, touch, stretch ratio and stretch-back ratio, and to a method for producing thereof.

BACKGROUND OF THE INVENTION

A sheet mainly composed of ultra fine fiber and elastomer has an excellent characteristic not exhibited by natural leather, and has been used for clothing, chair upholstery and automobile interior materials more widely year by year. Recently, a sheet excellent in stretchability has been demanded particularly from the viewpoint of comfortability to wear in clothing use and moldability in material use. Various studies have been made for such demand.

For example, a method for inserting woven or knitted material using polytrimethylene terephthalate fiber into textile for artificial leather as described above is described in Patent Document 1. Although this method utilizes stretchability due to the crystal structure of polytrimethylene terephthalate, the stretchability is low because of high-density nonwoven fabric with single fibers entangled with each other and allowed polyurethane to constrain the woven or knitted material from moving firmly. In addition, the fiber length of an ultra fine fiber for forming the nonwoven fabric is as short as 20 mm or less that repetitive stretching untangles the entanglement to bring deterioration in grade.

Also, a method for inserting woven or knitted material using potential crimping fiber composed of high shrinkage polyester and low shrinkage polyester is described in Patent Document 2. This method imparts stretchability, in which the woven or knitted material composed of potential crimping fiber is heat-treated to develop crimp, and the crimp is integrated with a fiber capable of converting into ultra fine fibers by needle punching. In the woven or knitted material made of the fiber having developed crimp, the crimped fiber is so easily hooked on a needle as to be cut when integrated with a fiber capable of converting into ultra fine fibers. Thus, the woven or knitted material with the cut fiber develops stretchability with difficulty. Polyurethane is provided after developing crimp in the woven or knitted material, and so the form of the sheet itself is fixed and stretchability thereof is developed with difficulty.

In addition, a method for inserting woven or knitted material using polyurethane fiber into nonwoven fabric for artificial leather is described in Patent Document 3. However, it is known that polyurethane is deteriorated with time, and the fabric by the method vanishes in stretchability due to use for many years. As in Patent Document 1, the fiber length of an ultra fine fiber is so short that repetitive stretching untangles the entanglement in the ultra fine fibers themselves to bring deterioration in grade.

That is to say, a method for obtaining a sheet excellent in surface appearances, touch, stretch ratio and stretch-back ratio has not been obtained so far.

Patent Document 1: Japanese Unexamined Patent Publication No. 11-269751
Patent Document 2: Japanese Unexamined Patent Publication No. 2000-336581
Patent Document 3: Japanese Unexamined Patent Publication No. 2004-91999

SUMMARY OF THE INVENTION

The present invention provides a sheet excellent in surface appearances, touch, stretch ratio and stretch-back ratio, and a method for producing thereof in view of the background of the prior art.

Embodiments of the present invention include any one of the following:

(1) a method for producing a stretch sheet, including the following steps (i) to (iii) in this order;

(i) a step of producing a sheet by entangling woven or knitted material including a thread composed of a composite fiber such that two kinds or more of polyethylene terephthalate polymers different in intrinsic viscosity are stuck together in a side-by-side type along the fiber length direction and/or of a core-in-sheath type composite fiber such that two kinds or more of polyethylene terephthalate polymers different in intrinsic viscosity form an eccentric core-in-sheath structure, with a fiber capable of converting into ultra fine fibers composed of two kinds or more of polymeric substances different in solubility in solvent, (ii) a step of developing an ultra fine fiber with an average single fiber fineness of 0.001 dtex or more and 0.5 dtex or less by treating the sheet with a solvent to thereafter provide elastomer having polyurethane as a main component by impregnating and solidifying solvent solution of elastomer having polyurethane as a main component into the sheet, or of providing elastomer having polyurethane as a main component by impregnating and solidifying solvent solution of elastomer having polyurethane as a main component into the sheet to thereafter develop an ultra fine fiber with an average single fiber fineness of 0.001 dtex or more and 0.5 dtex or less by treating the sheet with a solvent, and (iii) a step of rubbing and shrinking the woven or knitted material under the condition of 110° C. or more;

(2) the method for producing a stretch sheet according to (1), in which elastomer having polyurethane as a main component is provided after developing an ultra fine fiber in step (ii);

(3) the method for producing a stretch sheet according to (2), in which the step of providing water-soluble resin to the sheet is performed before step (ii);

(4) a stretch sheet including woven or knitted material including thread composed of a composite fiber such that two kinds or more of polyethylene terephthalate polymers different in intrinsic viscosity are stuck together in a side-by-side type along the fiber length direction and/or of a core-in-sheath type composite fiber such that two kinds or more of polyethylene terephthalate polymers different in intrinsic viscosity form an eccentric core-in-sheath structure, an ultra fine fiber with an average single fiber fineness of 0.001 dtex or more and 0.5 dtex or less, and elastomer having polyurethane as a main component, in which the thread composing woven or knitted material has a structure having a cavity in its inside;

(5) the stretch sheet according to (4), in which the elastomer is partially joined to the thread having a cavity;

(6) the stretch sheet according to (4) or (5), in which stretch ratio in longitudinal direction and/or transversal direction is 15% or more and 35% or less, and stretch-back ratio in longitudinal direction and/or transversal direction is 80% or more and 100% or less;

(7) the stretch sheet according to any one of (4) to (6), in which the content of the polyurethane is 10% by weight or more and 40% by weight or less with respect to the total weight of the ultra fine fiber and the woven or knitted material;

(8) the stretch sheet according to any one of (4) to (7), in which the polyurethane is polycarbonate polyurethane having a polycarbonate skeleton represented by the following general formulae (1) and (2); and

[Chemical formula 1]

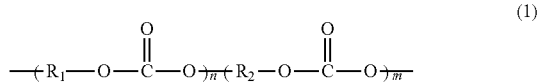

(1)

(in the formula, $R_1$ and $R_2$ are aliphatic hydrocarbon groups with a carbon number of 7 to 11, and may be same or different. n and m are positive integers, and $R_1$ and $R_2$ are block copolymerization or random copolymerization in the case of being different.)

[Chemical formula 2]

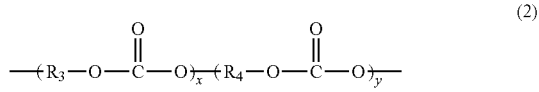

(2)

(in the formula, $R_3$ and $R_4$ are aliphatic hydrocarbon groups with a carbon number of 3 to 6, and may be same or different. x and y are positive integers, and $R_3$ and $R_4$ are block copolymerization or random copolymerization in the case of being different.)

(9) the stretch sheet according to any one of (4) to (8), in which the fiber length of the ultra fine fiber is 25 mm or more and 90 mm or less.

According to an embodiment of the present invention, woven or knitted material including a thread composed of a composite fiber such that two kinds or more of polyethylene terephthalate polymers different in intrinsic viscosity are stuck together in a side-by-side type along the fiber length direction and/or of a core-in-sheath type composite fiber such that two kinds or more of polyethylene terephthalate polymers different in intrinsic viscosity form an eccentric core-in-sheath structure are entangled with a fiber capable of converting into ultra fine fibers and make that into a state of a sheet, and thereafter rubbed and shrunk under the condition of 110° C. or more to develop crimp in the thread, so that the thread composing woven or knitted material has a cavity in the inside, and a sheet excellent in surface appearances, touch, stretch ratio and stretch-back ratio can be obtained.

BRIEF DESCRIPTION OF THE DRAWINGS

FIG. 1 is a view showing a method for confirming the presence or absence of a cavity in the inside of a thread.

REFERENCE NUMERALS

A: a line connecting the outer periphery of a thread and the center of an approximate circle thereof
B: a portion with the line A and the fiber superposed

DETAILED DESCRIPTION OF THE INVENTION

The stretch sheet in an embodiment of the present invention is a sheet including woven or knitted material including a thread composed of a composite fiber such that two kinds or more of polyethylene terephthalate polymers different in intrinsic viscosity are stuck together in a side-by-side type along the fiber length direction and/or of a core-in-sheath type composite fiber such that two kinds or more of polyethylene terephthalate polymers different in intrinsic viscosity form an eccentric core-in-sheath structure, an ultra fine fiber with an average single fiber fineness of 0.001 dtex or more and 0.5 dtex or less, and elastomer having polyurethane as a main component, and characterized in that the thread composing woven or knitted material has a structure having a cavity in its inside.

The woven or knitted material in an embodiment of the present invention is a woven or knitted material including a thread composed of a composite fiber such that two kinds or more of polyethylene terephthalate polymers different in intrinsic viscosity are stuck together in a side-by-side type along the fiber length direction and/or of a core-in-sheath type composite fiber such that two kinds or more of polyethylene terephthalate polymers different in intrinsic viscosity form an eccentric core-in-sheath structure, and the thread composing the woven or knitted material has a cavity in its inside. In the thread obtained by spinning and drawing so as to form a structure such that polyethylene terephthalate polymers different in intrinsic viscosity are stuck together in a side-by-side type along the fiber length direction and/or an eccentric core-in-sheath structure, internal strains different between two components is caused by stress concentration on the higher viscosity side during drawing. Due to such internal strains, the higher viscosity side is shrunk so greatly by elastic recovery difference after drawing and heat shrinkage difference in the after-mentioned shrinking step of woven or knitted material (the step (iii)) that strain is caused in single fiber to develop crimp. As described later, woven or knitted material is entangled with a fiber capable of converting into ultra fine fibers and made into a sheet, and thereafter rubbed and shrunk under the condition of 110° C. or more, so that the thread composing woven or knitted material has a structure having a cavity in its inside (hereinafter referred to as a hollow structure). This hollow structure of the thread exhibits stretchability in the sheet, and provides bulges to the sheet and voids inside the sheet, so that soft touch and moderate resiliency are felt and a satisfactory sense of hand feeling is obtained. Strong shrinkage force of woven or knitted material increases fiber density on the surface of the sheet, and minute grade of high quality and favorable touch are obtained.

The composite fiber stuck together in a side-by-side type and the core-in-sheath type composite fiber are composed of two kinds of polyethylene terephthalate polymers, and the intrinsic viscosity difference of the two kinds of polyethylene terephthalate polymers is preferably 0.2 or more.

The intrinsic viscosity difference of polyethylene terephthalate copolymers may be set at desired viscosity by properly adjusting time, temperature, catalytic amount and copolymerization component in polymerization.

The intrinsic viscosity in the present invention is a value measured at a temperature of 25° C. by dissolving a sample in ortho-chlorophenol as described later.

The polyethylene terephthalate polymers in embodiments of the present invention have as a main component a structure such that terephthalic acid or derivatives thereof are copolymerized with ethylene glycol or derivatives thereof, and the main component herein signifies more than 50% by weight with respect to the total weight. Copolymerization components capable of forming other ester linkages may be contained. Examples of copolymerizable compounds include dicarboxylic acids such as isophthalic acid, succinic acid, cyclohexanedicarboxylic acid, adipic acid, dimer acid, sebacic acid and 5-sodium isophthalate, and diols such as ethylene glycol, diethylene glycol, butanediol, neopentyl glycol, cyclohexanedimethanol, polyethylene glycol and polypropylene glycol, but not limited thereto. Titanium dioxide as a flatting agent, particulates of silica and alumina as a lubricant, and hindered phenol derivatives and coloring pigment as an antioxidant may be added as required.

In an embodiment of the present invention, it is preferred that composite fiber composing woven or knitted material is composed of polyethylene terephthalate polymers; the reason thereof is to have the most appropriate properties in the production of the stretch sheet of the present invention in an exemplary embodiment. For example, in the case where a sheet is produced by using woven or knitted material composed of composite fiber using polytrimethylene terephthalate, polytrimethylene terephthalate has properties sensitive against heat as to be easily shrunk by heat. Thus, in the case of processing a sheet by applying these woven or knitted material, crimp is developed by heat applied during processing in the unintended step, and consequently a sheet poor in stretchability is easily made. On the other hand, composite fiber using polyethylene terephthalate develops crimp at relatively high temperature, so that crimp may be prevented from being developed in the unintended step and a sheet excellent in stretchability can be obtained. The composite fiber composed of polyethylene terephthalate polymers has a sense of resiliency, so that a moderate sense of resiliency is offered in the case of being made into a sheet to provide a favorable sense of hand feeling.

With regard to each intrinsic viscosity of polyethylene terephthalate polymers, the intrinsic viscosity difference between high viscosity component and low viscosity component is preferably 0.2 or more.

The compound ratio of both components is preferably a range of high viscosity component: low viscosity component=75:25 to 35:65 (% by weight), more preferably a range of 65:35 to 45:55 (% by weight) in view of filature and the formation of a cavity in a thread composed of composite fiber.

The fiber cross-sectional shape of composite fiber may be a circular cross section, a triangular cross section, a multilobar cross section, a flat cross section, an X-shaped cross section and other various kinds of irregular cross sections, and is not particularly limited. It is preferable that a semicircular side-by-side type of a circular cross section be used from the viewpoint of a balance between crimp development and touch, a hollow side-by-side type be used from the viewpoint of a balance between light weight, thermal insulation and a sense of resiliency, and a side-by-side type of a triangular cross section be used from the viewpoint of dry touch.

The composite fiber preferably has a twisting factor of 5000 or more and 25000 or less. A twisting factor of 5000 or more prevents thread from being damaged in being entangled with a fiber capable of converting into ultra fine fibers and made into a sheet in the later processing, while a twisting factor of 25000 or less provides sufficient stretchability; more preferably, 8000 or more and 20000 or less. The twisting factor K herein is:

$$\text{twisting factor } K = T \times D^{0.5}$$

wherein T: number of twist per 1 m of thread length (times), D: fineness of a thread (dtex)

The number of twist per 1 m of thread length T is a value such that the number of untwisting in completely untwisting by an electric twist tester under a load of $90 \times 10^{-3}$ cN/dtex is divided by thread length after untwisting.

The woven or knitted material in an embodiment of the present invention is preferably composed of the composite fiber of a side-by-side type and a core-in-sheath structure as described above entirely, and may include other fibers without deteriorating the effect of the present invention. For example, the use of the composite fiber as described above for only weft yarn or only warp yarn provides stretchability in only transversal direction or only longitudinal direction.

In the present invention, the woven or knitted material is a generic term for woven fabrics and knitted fabrics, and structure thereof is not particularly limited. Examples of woven fabrics include plain weaves, twill weaves and satin weaves; preferably, plain weaves in view of costs. Examples of knitted fabrics include round braid, tricot and raschel.

Examples of ultra fine fibers composing the stretch sheet of the present invention include polyesters such as polyethylene terephthalate, polybutylene terephthalate, polytrimethylene terephthalate and polyethylene 2,6-naphthalene dicarboxylate, polyamides such as 6-nylon and 6,6-nylon, and various kinds of synthetic fibers such as acrylic polyethylene and polypropylene. Among them, polyester fibers such as polyethylene terephthalate, polybutylene terephthalate and polytrimethylene terephthalate are preferably used from the viewpoint of strength, dimensional stability, light resistance and dye-affinity. The sheet may be composed of plural kinds of ultra fine fibers made of different raw materials by mixture.

In order to improve hiding, inorganic particles such as titanium oxide particles, a lubricant, a pigment, a heat stabilizer, an ultraviolet absorbing agent, a conductive agent, a heat storage agent and an anti-fungus agent may be also added to these polymers in accordance with various kinds of purposes.

It is beneficial that the average single fiber fineness of ultra fine fibers composing the stretch sheet is selected to be 0.001 dtex or more and 0.5 dtex or less from the viewpoint of flexibility and nap grade of the sheet; preferably 0.3 dtex or less, more preferably 0.2 dtex or less. On the other hand, the average single fiber fineness is preferably 0.005 dtex or more, more preferably 0.01 dtex or more from the viewpoint of chromogenic properties after dyeing, and dispersibility and easiness to separate the fibers during treatment of raising such as buffing by sandpaper or the like.

The average single fiber fineness of ultra fine fibers is calculated in such a manner that a scanning electron microscope (SEM) picture of the sheet surface is taken to randomly select circular or elliptic close to circle fibers by 100 pieces and measure the fiber diameters, which are converted into fineness by specific gravity of the raw material polymer to further calculate average value thereof.

The cross-sectional shape of ultra fine fibers may be a circular cross section, and may adopt an ellipse, a flat shape a polygonal cross sections such as a triangle, and irregular cross sections such as a fan shape and a cross shape. The average single fiber fineness of a fiber having an irregular cross section is calculated in such a manner that fineness of the fiber cross section with respect to the circumcircle is calculated and is multiplied by the area ratio of the fiber cross section to the circumcircle.

The ultra fine fibers as described above are preferably laminated and entangled in the form of nonwoven fabric with the woven or knitted material. The nonwoven fabric (hereinafter referred to as ultra fine fiber web) may be staple fiber nonwoven fabric or filament fiber nonwoven fabric; preferably, staple fiber nonwoven fabric in the case of emphasizing much of touch and grade. In the case of staple fiber nonwoven fabric, the fiber length is preferably 25 mm or more and 90 mm or less. A fiber length of 90 mm or less allows favorable grade and touch, while a fiber length of 25 mm or more allows a sheet to have abrasion resistance and to tolerate repetitive stretching. For example, in the case of using very short staple fiber in a papermaking method, the fiber falls off greatly and the nap on the surface vanishes, and the staple fiber is untangled by repetitive stretching to remarkably deteriorate the grade of the sheet. In order to restrain this, an increase in the added amount of elastomer having polyurethane as a main component leads to the hardening of touch and the deterioration of stretchability. However, in the case of the fiber length in the above-mentioned range, a structure where the ultra fine fibers are firmly entangled does not cause the falling off of many fibers and the untanglement of the fibers by repetitive stretching, and enables favorable grade to be maintained.

In an embodiment of the present invention, elastomer having polyurethane as a main component is provided to a sheet composed of woven or knitted material made of the composite fiber and ultra fine fibers. The elastomer is a polymer having rubber elasticity for expansion and contraction, and examples thereof include polyurethane, SBR, NBR and acrylic resin. The main component herein signifies that the weight of polyurethane is more than 50% by weight with respect to the weight of the whole elastomer.

Polyurethane having a structure such that polyol, polyisocyanate and chain extender are properly reacted can be used as polyurethane used for an embodiment of the present invention.

Polycarbonate diol, polyester diol, polyether diol, silicone diol, fluorine diol and copolymer therewith may be used as polyol. Among them, polycarbonate diol and polyester diol are preferably used from the viewpoint of light resistance. In addition, shrinkage under the condition of high temperature is performed for allowing a structure having a cavity at the center to the composite fiber composing woven or knitted material in a sheet, and polycarbonate is more preferable in view of having heat resistance to this high temperature condition.

Polycarbonate diol can be produced by transesterification of alkylene glycol and carbonate, or reaction of phosgene or chloroformate and alkylene glycol. Examples of alkylene glycol include straight-chain alkylene glycols such as ethylene glycol, propylene glycol, 1,4-butanediol, 1,5-pentanediol, 1,6-hexanediol, 1,9-nonanediol and 1,10-decanediol, branched alkylene glycols such as neopentyl glycol, 3-methyl-1,5-pentanediol, 2,4-diethyl-1,5-pentanediol and 2-methyl-1,8-octanediol, alicyclic dial such as 1,4-cyclohexanediol, aromatic dial such as bisphenol A, glycerin, trimethylolpropane, and pentaerythritol. Both polycarbonate dial obtained from each alkylene glycol singly and copolymerized polycarbonate diol obtained from two kinds or more of alkylene glycols may be used.

Examples of polyisocyanate include aliphatics such as hexamethylene diisocyanate, dicyclohexylmethane diisocyanate, isophorone diisocyanate and xylylene diisocyanate, and aromatics such as diphenylmethane diisocyanate and tolylene diisocyanate; these may be used in combination. Among them, aliphatics such as hexamethylene diisocyanate, dicyclohexylmethane diisocyanate and isophorone diisocyanate are preferable from the viewpoint of light resistance.

Examples of chain extender include amines such as ethylenediamine and methylenebisaniline, diol such as ethylene glycol, and polyamine obtained by reacting polyisocyanate with water.

With regard to polyurethane used for an embodiment of the present invention, the softening point is preferably 200° C. or more and 300° C. or less. A softening point of 200° C. or more allows the shape of a sheet to be retained even under the high temperature condition in the shrinking step (the step (iii)) performed for forming a cavity inside a thread composing woven or knitted material, where the thread is composed of the composite fiber. A softening point of 300° C. or less makes polyurethane flexible and provides favorable touch as a stretch sheet. The softening point is measured in a dry film of polyurethane by using a thermomechanical analysis apparatus. The softening point of polyurethane existing in the sheet may be measured in such a manner that polyurethane is extracted from the sheet by using N,N'-dimethylformamide (hereinafter abbreviated as DMF) to produce a dry film with a thickness of 0.2 mm to 0.4 mm.

With regard to polyurethane, the gelation point is preferably 2.5 ml or more and 6 ml or less, more preferably 3 ml or more and 5 ml or less. The gelation point herein signifies a value of the water dropping amount when 100 g of DMF solution of 1% by weight-polyurethane is stirred while dropping distilled water into this solution and becomes slightly clouded after the coagulation of polyurethane starts on the temperature conditions of 25±1° C. Thus, DMF used for the measurement needs to be used at a moisture of 0.03% or less. The gelation point of polyurethane existing in the sheet can be measured in such a manner that polyurethane is extracted from the sheet by using DMF to adjust the polyurethane concentration at 1% by weight.

This gelation point signifies moisture tolerance in wet-coagulating polyurethane by using polyurethane DMF solution; generally; lower gelation point tends to bring faster coagulation rate and higher gelation point tends to bring slower coagulation rate. Thus, in the case where the gelation point is less than 2.5 ml, the coagulation rate is so fast in wet-coagulating polyurethane resin that the foaming of polyurethane existing inside a nonwoven fabric easily becomes large and coarse. As a result of easily causing partial foaming failure, inferior nap grade with uneven nap length of the surface is easily brought in the case of buffing the surface of a sheet by sandpaper. The polyurethane film is so thin that the effect as a binder for fixing the fibers becomes too small, and the problem is that many fibers fall off in the case of fretting the surface grade by a brush or the like. On the other hand, in the case where the gelation point is more than 6 ml, the coagulation rate is so slow in wet-coagulating polyurethane resin that the foaming is scarcely observed in polyurethane existing inside a nonwoven fabric and polyurethane tends to exist as thick and hard film. Thus, in the case of buffing the surface of a sheet by sandpaper, polyurethane is buffed with difficulty and inferior grade with short nap of the surface is easily brought. In addition, a thread composed of the composite fiber in woven or knitted material has a hollow structure with difficulty and the sheet tends to be hard in touch and poor in stretchability. The reason thereof is that polyurethane tends to exist as thick and hard film, so that the sheet itself becomes hard, and the thread composed of the composite fiber in woven or knitted material is hindered from shrinking for firmly constraining woven or knitted material including the thread composed of the composite fiber and ultra fine fiber.

Polycarbonate polyurethane having a polycarbonate skeleton represented by the following general formulae (1) and (2) is preferable as polyurethane which is composed of polycarbonate polyol resistant to high-temperature shrinkage and which satisfies the above-mentioned softening point and gelation point.

[Chemical formula 3]

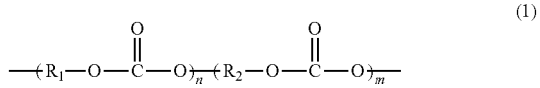

(1)

(in the formula, $R_1$ and $R_2$ are aliphatic hydrocarbon groups with a carbon number of 7 to 11, and may be same or different. n and m are positive integers, and $R_1$ and $R_2$ are block copolymerization or random copolymerization in the case of being different.)

[Chemical formula 4]

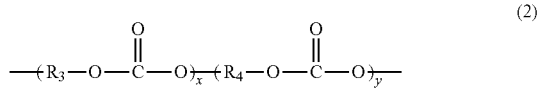

(2)

(in the formula, $R_3$ and $R_4$ are aliphatic hydrocarbon groups with a carbon number of 3 to 6, and may be same or different. x and y are positive integers, and $R_3$ and $R_4$ are block copolymerization or random copolymerization in the case of being different.)

In an embodiment of the present invention, elastomer having polyurethane as a main component may contain elastomer resin such as polyester, polyamide and polyolefin-type, acrylic resin, and ethylene-vinyl acetate resin without deteriorating performance and touch as a binder, and may contain various kinds of addition agents, for example, pigment such as carbon black, flame retardant such as phosphorus, halogen and inorganic-type, antioxidant such as phenol, sulfur and phosphorus-type, ultraviolet absorbing agent such as benzotriazole, benzophenone, salicylate, cyanoacrylate and oxalic acid anilide-type, light stabilizer such as hindered amine and benzoate-type, hydrolysis resistance stabilizer such as polycarbodiimide, plasticizer, antistatic agent, surface-active agent, coagulation regulator, and dye-stuff.

In a stretch sheet of an embodiment of the present invention, the content of elastomer having polyurethane as a main component with respect to ultra fine fiber and woven or knitted material is preferably 10% by weight or more and 40% by weight or less. The content of 10% by weight or more provides abrasion resistance and shape retention resistant to repetitive stretching. The content of 40% by weight or less prevents the touch of the sheet from hardening, and dose not hinder woven or knitted material from shrinking in the shrinkage of woven or knitted material in the after-mentioned shrinking step of woven or knitted material (the step (iii)), whereby stretchability can be developed. The content is more preferably 15% by weight or more and 35% by weight or less, far more preferably 15% by weight or more and 30% by weight or less.

The stretch sheet may contain functional agents such as dyestuff, pigment, flexibilizer, touch regulator, pilling inhibitor, anti-fungus agent, deodorant, water repellent, light-resistant agent and weather-resistant agent.

With regard to the stretch sheet of an embodiment of the present invention, it is preferable that stretch ratio in longitudinal direction and/or transversal direction of the sheet is to be 15% or more and 35% or less, and stretch-back ratio in longitudinal direction and/or transversal direction is to be 80% or more and 100% or less. A stretch ratio of 15% or more provides favorable comfortability to wear, beautiful silhouette in clothing use, and favorable moldability in material use. A stretch ratio of 35% or less ensures favorable grade and favorable moldability in stretching. In addition, a stretch-back ratio of 80% or more and 100% or less provides favorable stretch-back properties and shape retention.

Next, an embodiment of a method for producing a stretch sheet as described above is described.

A method for producing a stretch sheet in an embodiment of the present invention includes the following steps (i) to (iii) in this order:

(i) the step of producing a sheet by entangling woven or knitted material including a thread composed of a composite fiber such that two kinds or more of polyethylene terephthalate polymers different in intrinsic viscosity are stuck together in a side-by-side type along the fiber length direction and/or of a core-in-sheath type composite fiber such that two kinds or more of polyethylene terephthalate polymers different in intrinsic viscosity form an eccentric core-in-sheath structure, with a fiber capable of converting into ultra fine fibers composed of two kinds or more of polymeric substances different in solubility in solvent;

(ii) the step of developing an ultra fine fiber with an average single fiber fineness of 0.001 dtex or more and 0.5 dtex or less by treating the sheet with a solvent to thereafter provide elastomer having polyurethane as a main component by impregnating and solidifying solvent solution of elastomer having polyurethane as a main component into the sheet, or of providing elastomer having polyurethane as a main component by impregnating and solidifying solvent solution of elastomer having polyurethane as a main component into the sheet to thereafter develop an ultra fine fiber with an average single fiber fineness of 0.001 dtex or more and 0.5 dtex or less by treating the sheet with a solvent; and (iii) the step of rubbing and shrinking the woven or knitted material under the condition of 110° C. or more.

Performing steps (i) to (iii) in this order makes it possible to obtain a sheet excellent in surface appearances, touch, stretch ratio and stretch-back ratio.

First, step (i) is described.

In step (i), as described above, a sheet is produced by entangling woven or knitted material including a thread composed of a composite fiber such that two kinds or more of polyethylene terephthalate polymers different in intrinsic viscosity are stuck together in a side-by-side type along the fiber length direction and/or of a core-in-sheath type composite fiber such that two kinds or more of polyethylene terephthalate polymers different in intrinsic viscosity form an eccentric core-in-sheath structure, with a fiber capable of converting into ultra fine fibers composed of two kinds or more of polymeric substances different in solubility in solvent.

A method for producing composite fiber is not particularly limited; for example, in the case of the side-by-side type composite fiber, it can be obtained in such a manner that a high-viscosity polyethylene terephthalate polymer is disposed as one of the two kinds of polyethylene terephthalate polymers and a low-viscosity polyethylene terephthalate polymer is disposed as the other of the two kinds of polyethylene terephthalate polymers, joined at the exhaust port top of a spinneret, and formed into a side-by-side composite stream, and the resultant is thereafter discharged from an exhaust port for obtaining a desired cross-sectional shape. The discharged line of thread is may be produced by a two-step method where the line is once wound up after being cooled and solidified, and then is subjected to drawing and draw false twisting, or by a direct spin drawing method for taking up yarn and thereafter drawing directly.

Subsequently, woven or knitted material made of such composite fiber are entangled with a fiber capable of converting into ultra fine fibers composed of two kinds or more of polymeric substances different in solubility in solvent, and thereafter treated with a solvent in step (ii) to perform ultra-fining of the fiber, whereby a sheet with ultra fine fibers and woven or knitted material entangled is obtained.

As the fiber capable of converting into ultra fine fibers, the following may be adopted: a sea-island type composite fiber such that two components of thermoplastic resins different in solubility in solvent are regarded as a sea component and an island component to make the island component into ultra fine fibers by removing the sea component by dissolving it with the use of solvent; and a peeling type composite fiber such that the two components of thermoplastic resins are alternately disposed with the fiber surface radially or multilayered, and divided into ultra fine fibers by peeling and dividing by solvent treatment. Among them, the sea-island type composite fiber is preferable also from the viewpoint of flexibility and touch of a base material for the reason that the removal of the sea component provides a moderate void between the island components, that is, between the ultra fine fibers inside a fiber bundle.

Examples of the sea-island type composite fiber include a fiber by an alternate polymer arrangement method such that two components of sea and island are alternately arranged and spun by using a sea-island type composite spinneret, and a fiber by a mix spinning method such that two components of sea and island are mixed and spun; the sea-island type composite fiber by an alternate polymer arrangement method is more preferable in view of providing ultra fine fibers with uniform fineness.

In the case of the sea-island type composite fiber, as the sea component, polyethylene, polypropylene, polystyrene, copolymerization polyester such that sodium 5-sulfoisophthalate and polyethylene glycol are copolymerized, polylactic acid, and water-soluble thermoplastic polyvinyl alcohol resin can be used.

The fiber capable of converting into ultra fine fibers is preferably subjected to crimp processing, cut into a predetermined length, made into a nonwoven fabric (an ultra fine fiber web) by a cloth wrapper, and laminated and entangled in the form of the nonwoven fabric with the above-mentioned woven or knitted material. The fibers capable of converting into ultra fine fibers are easily entangled with each other by being subjected to the crimp processing. The crimp processing and cut processing may adopt known methods. As a method for entangling the fiber capable of converting into ultra fine fibers with the woven or knitted material to obtain a sheet, known methods such as needle punching and water-jet punching can be adopted.

The obtained sheet may be subjected to shrinkage treatment by hot water or steam treatment for improving a sense of minuteness of the fiber. However, the shrinkage treatment at high temperature needs to be carefully performed for the reason that crimp is developed in the composite fiber composing the woven or knitted material, and when elastomer is subjected in the state in the next step, a sheet is poor in stretchability. The shrinkage treatment in this state is preferably performed at a temperature of 100° C. or less.

Next, step (ii) is described.

In step (ii), an ultra fine fiber with an average single fiber fineness of 0.001 dtex or more and 0.5 dtex or less is developed by treating with a solvent the sheet composed of the fiber capable of converting into ultra fine fibers and the woven or knitted material to thereafter provide elastomer having polyurethane as a main component by impregnating and solidifying solvent solution of elastomer having polyurethane as a main component into the sheet. Alternatively, with the order reversed in these steps, elastomer having polyurethane as a main component may be provided by impregnating and solidifying solvent solution of elastomer having polyurethane as a main component into the sheet composed of the fiber capable of converting into ultra fine fibers and the woven or knitted material to thereafter develop an ultra fine fiber with an average single fiber fineness of 0.001 dtex or more and 0.5 dtex or less by treating the sheet with a solvent.

Here, in the case where the fiber capable of converting into ultra fine fibers is the sea-island type composite fiber, the components as described above may be used as the sea component; in the case where the sea component is polyethylene, polypropylene or polystyrene, organic solvents such as toluene and trichloroethylene can be used as the solvent in step (ii). In the case where the sea component is copolymerization polyester or polylactic acid, alkali aqueous solution such as sodium hydroxide can be used as the solvent. In addition, in the case where the sea component is water-soluble thermoplastic polyvinyl alcohol resin, hot water can be used as the solvent. In any of the cases, the sheet including the sea-island type composite fiber can be immersed and squeezed in solvent to thereby remove the sea component and develop an ultra fine fiber.

Examples of a method for providing elastomer having polyurethane as a main component to the sheet include a method for impregnating and wet-coagulating polyurethane solution containing elastomer as described above into the sheet, and a method for impregnating and dry-coagulating the polyurethane solution into the sheet; but not particularly limited.

In an embodiment of the present invention, as described above, elastomer may be provided to the sheet to thereafter develop an ultra fine fiber, but yet an ultra fine fiber is preferably developed to thereafter provide elastomer. Elastomer grasps an ultra fine fiber by developing an ultra fine fiber to thereafter provide elastomer, and so the sheet becomes to be able to endure a longer-term use with no ultra fine fibers falling off even in repetitive stretching. The degree of the grasp of an ultra fine fiber by elastomer is preferably adjusted by the added amount of the water-soluble resin. In the case of providing elastomer to thereafter develop an ultra fine fiber, elastomer has a structure such as not to grasp an ultra fine fiber, and so the added amount of elastomer is preferably increased for making a sheet to be able to endure a long-term use. However, in this case, when shrinkage of woven or knitted material is performed in step (iii), elastomer hinders woven or knitted material so easily from shrinking that stretchability tends to be developed with difficulty.

In the case of developing an ultra fine fiber to thereafter provide elastomer, water-soluble resin is preferably provided to the sheet obtained in step (i) before step (ii). By providing water-soluble resin to the sheet, the surface of the fiber capable of converting into ultra fine fibers and the surface of the composite fiber composing woven or knitted material are protected by the water-soluble resin. Specifically, the fiber bundle surface of the fiber capable of converting into ultra fine fibers and the surface of the composite fiber composing woven or knitted material are partially protected by the water-soluble resin, so that in the case of providing elastomer having polyurethane as a main component to the sheet in step (ii), the place where elastomer and the single fiber or the composite fiber are directly joined exists not continuously but partially on the surface of the single fiber located in the outermost periphery of the fiber bundle of the ultra fine fibers and the composite fiber composing woven or knitted material, whereby the bond area of elastomer to the ultra fine fibers and the composite fiber may be retained in a proper amount. As a result, the finally obtained stretch sheet has a structure with a moderate degree of freedom to the ultra fine fibers and the woven or knitted material while securing the physical properties such as abrasion resistance, and can restrain shrinkage of woven or knitted material from being hindered in the shrinkage treatment in step (iii) while increasing the strength. Thus, in the shrinkage treatment in step (iii), the woven or knitted material can be further shrunk and the thread composed of the composite fiber in the woven or knitted material has a hollow structure more easily, so that the finally obtained sheet has favorable touch and sense of hand feeling and high stretchability.

Such water-soluble resin is not particularly limited, preferably polyvinyl alcohol with a saponified degree of 80% or more.

The added amount of water-soluble resin is preferably 1% by weight or more and 30% by weight or less with respect to the weight of the sheet. The added amount of 1% by weight or more allows the sheet to have favorable touch and stretchability, while the added amount of 30% by weight or less allows the sheet to have favorable processability and physical properties such as abrasion resistance.

Examples of a method for providing water-soluble resin include a method for impregnating and drying aqueous solution of water-soluble resin, but are not particularly limited. Drying temperature and drying time are not particularly limited, and yet drying is preferably performed so that the temperature of the sheet is less than 110° C. for the reason that the temperature of the sheet is so high that the crimp of the woven or knitted material is developed. The temperature of heated air given for drying may be 110° C. or more if the temperature of the sheet itself is kept at less than 110° C.

The provided water-soluble resin is favorably removed from the sheet by hot water before step (iii).

Next, step (iii) is described.

In step (iii), a sheet composed of woven or knitted material, ultra fine fibers and elastomer having polyurethane as a main component is put in a jet dyeing machine, and woven or knitted material in the sheet are rubbed and shrunk under the condition of 110° C. or more.

In a method of an embodiment of the present invention, the shrinkage of woven or knitted material is achieved by subjecting it to treatment of rubbing at a temperature of 110° C. or more with a jet dyeing machine. The rubbing by a jet dyeing machine is provided to the sheet under the condition of 110° C. or more, so that the crimp of a thread and the shrinkage of woven or knitted material are developed, and the thread composed of the composite fiber in the sheet has a structure having a cavity in the inside. As a result, stretchability is provided to the sheet, and favorable touch and grade can be further obtained.

A jet dyeing machine can be used for rubbing the sheet at a temperature of 110° C. or more, and known jet dyeing machines can be used as the jet dyeing machine.

The treatment temperature needs to be 110° C. or more; the treatment at higher temperature allows the crimp of a thread and the shrinkage of woven or knitted material to be easily developed and allows the thread composed of the composite fiber to easily have a structure having a cavity in the inside. However, the treatment at too high temperature causes thermal degradation in elastomer having polyurethane as a main component; therefore, preferably 120° C. or more and 150° C. or less, more preferably 125° C. or more and 135° C. or less.

In an embodiment of the present invention, it is especially preferred that the sheet be heated at high temperature in this step (iii) to shrink woven or knitted material and develop the crimp of a thread. For example, in the case where the woven or knitted material with shrinkage and crimp previously developed are inserted in step (ii), the fibers of woven or knitted material are cut by entanglement treatment such as needle punching and exposed to the sheet surface, so that surface appearance grade is deteriorated and the thread composed of the composite fiber in the sheet does not have a structure having a cavity in the inside to occasionally cause a deterioration in stretchability and a deterioration in a sense of hand feeling and grade. In the case of providing a woven or knitted material having crimp developed with polyurethane in step (ii), the shape of the sheet itself is fixed to develop stretchability with difficulty. Thus, in an embodiment of the present invention, after being integrated into the sheet, it is desirable that woven or knitted material in the sheet is shrunk so that the thread composed of the composite fiber have a structure having a cavity in the inside.

Dyeing may be performed simultaneously with shrinkage treatment in step (iii). The dyestuff is not particularly limited but may be selected in accordance with ultra fine fibers composing the sheet. For example, disperse dyestuff can be used in the case where the sheet is composed of polyester ultra fine fibers, and acidic dyestuff and premetalized dyestuff can be used in the case where the sheet is composed of polyamide ultra fine fibers. In the case of dyeing with disperse dyestuff, reduction cleaning may be performed after dyeing.

A dyeing assistant is preferably used in dyeing for the purpose of improving uniformity and repeatability of dyeing. In addition, finishing compound treatment such as softening agent (such as silicone), and antistatic agent may be performed, and finishing treatment may be performed after dyeing or in the same bath as dyeing.

A sheet with stretchability in an embodiment of the present invention may be made into a nap-like sheet having the nap of ultra fine fibers on at least one side. For this purpose, raising treatment is preferably performed between step (ii) and step (iii) or after step (iii).

The raising treatment for forming nap on the sheet surface can be performed by a method for buffing with the use of sandpaper and roll sander. A lubricant such as silicone emulsion may be provided before the raising treatment. An antistatic agent is preferably provided before the raising treatment for the reason that buffing powder caused from the sheet by buffing is to be accumulated on sandpaper with difficulty.

The sheet may be cut in half or divided into several pieces in the sheet thickness direction before step (ii) or step (iii).

A sheet obtained by a method of the present invention according to an exemplary embodiment as described above is so excellent in surface appearances, touch, stretch ratio and stretch-back ratio as to be capable of being appropriately used as interior material with very graceful surface appearances for cover material of furniture and chairs and wall material, and cover material for seats and ceiling in vehicle cabins of automobiles, trains and aircrafts. In addition, the sheet may be appropriately used as clothing material for shirts, jackets, bags, belts, wallet and a part thereof, and upper and trim of shoes such as casual shoes, sport shoes, men's shoes and ladies' shoes.

EXAMPLES

Embodiments of the present invention are hereinafter described more specifically by using examples, but not limited only to the following examples.

[Evaluation Methods]
(1) Intrinsic Viscosity

A sample polymer was dissolved by 0.8 g in 10 mL of ortho-chlorophenol (hereinafter abbreviated as OCP) to obtain relative viscosity $\eta r$ at a temperature of 25° C. from the following expression by using an Ostwald viscometer and calculate intrinsic viscosity (IV).

$$\eta r = \eta/\eta_0 = (t \times d)/(t_0 \times d_0)$$

Intrinsic viscosity IV=$0.0242\eta r+0.2634$ wherein, $\eta$: viscometer of the polymer solution
 $\eta_0$: viscometer of OCP
 $t$: fall time of the solution (second)
 $d$: density of the solution (g/cm$^3$)
 $t_o$: fall time of OCP (second)
 $d_o$: density of OCP (g/cm$^3$)

(2) Average Single Fiber Fineness

The average single fiber fineness was calculated in such a manner that a scanning electron microscope (SEM) picture of the sheet cross section was taken to randomly select circular or elliptic close to circle fibers by 100 pieces and measure the fiber diameters, which were converted into fineness by specific gravity of the raw material polymer of the fibers (1.38 g/cm³ in polyethylene terephthalate) to further calculate average value of 100 pieces.

(3) Softening Point of Polyurethane

DMF solution of 25% by weight-polyurethane was left at room temperature for 20 hours and defoamed, and thereafter applied with a thickness of 1.0 mm on a glass plate and dried by a circulating type drier at a temperature of 70° C. for 3 hours and by a vacuum dryer at a temperature of 60° C. for 3 hours, and a polyurethane film is peeled off from the glass plate to obtain a dry film of polyurethane. With regard to the obtained polyurethane dry film, softening point was measured by using thermal analysis equipment.

(4) Gelation Point of Polyurethane

The water dropping amount was regarded as gelation point when 100 g of DMF solution of 1% by weight-polyurethane was stirred while dropping distilled water into this solution and became slightly clouded after the coagulation of polyurethane started on the temperature conditions of 25±1° C.

(5) Confirmation of Cavity of a Thread in Woven or Knitted Material

A scanning electron microscope (SEM) picture of the sheet cross section was taken to select a circular or elliptic close to circle line of thread composing woven or knitted material and draw an approximate circle as shown in FIG. 1. Subsequently, a line A connecting the outer periphery of the thread and the center of the approximate circle was drawn to measure the length of a portion B where the line A and the fiber are superposed and to measure the ratio of the length of the line B to the length of the line A. This was performed for 100 pieces randomly selected, and the case where the average of 10 pieces was 80% or less was determined as a structure having a cavity inside the thread.

(6) Stretchability

Stretchability was evaluated by stretch ratio and stretch-back ratio. With regard to each direction of the sheet, the case where both stretch ratio and stretch-back ratio exceeded target value was regarded as 'P' in evaluation, namely, passed, and the case where either or both of stretch ratio and stretch-back ratio did not exceed target value was regarded as 'F' in evaluation, namely, failed. The case where either or both of longitudinal direction and transversal direction passed was determined as a sheet with stretchability, namely, 'P', and the case where both longitudinal direction and transversal direction failed was determined as failed, namely, 'F'.

Stretch Ratio

The stretch ratio of the sheet was measured in accordance with JIS L 1096 (2005) 8.14.1 B method (constant load method). The length between grips was 50 cm.

A favorable level (target value) is 15% or more and 35% or less in stretch ratio.

Stretch-Back Ratio

The stretch-back ratio of the sheet was measured in accordance with JIS L 1096 (2005) 8.14.2 B-1 method (constant load method). The length between grips was 50 cm and the exposure time after removing the load was 1 hour.

A favorable level (target value) is 80% or more and 100% or less in stretch-back ratio.

(7) Surface Appearance Grade

The surface grade of a leather-like sheet was evaluated in the following manner by visual observation and sensory evaluation with evaluators of twenty persons in total of healthy ten male adults and female adults each to regard the most evaluation as surface appearance grade. In the case where the evaluation result was divided in the same number, worse evaluation was regarded as surface appearance grade. A favorable level is 'A' or 'B'.

A: dispersion state of the fibers is favorable with a sense of minuteness and surface appearance is favorable B: dispersion state of the fibers is partially somewhat unfavorable and surface appearance is tolerably favorable C: dispersion state of the fibers is entirely very poor and surface appearance is unfavorable (8) Touch The following evaluation was distinguished by the sense of touch with evaluators of twenty persons in total of healthy ten male adults and female adults each to regard the most evaluation as touch. In the case where the evaluation result was divided in the same number, worse evaluation was regarded as touch. A favorable level is 'A' or 'B'.

A: very soft

B: soft

C: hard

D: very hard (9) Pilling Evaluation

The pilling evaluation of the sheet was performed in such a manner that a load equivalent to 12 kPa was applied using Model 406 manufactured by James H. Heal & Co. as Martindale abrasion tester and ABRASTIVE CLOTH SM25 manufactured by the same company as a standard rubbing cloth, and the surface appearances of a sample after rubbing on the conditions of an abrasion number of 20,000 was observed by visual observation. The criterion for evaluation was determined by surface appearances and the number of pills to evaluate in the following manner.

Fifth degree: surface appearances of the sample have no change from the state before rubbing Fourth and a half degree: nap of the sample surface lies and no pill is caused Fourth degree: one pill is caused on the sample surface Third and a half degree: two or three pills are caused on the sample surface Third degree: four or five pills are caused on the sample surface Second and a half degree: six or ten pills are caused on the sample surface Second degree: eleven or fifteen pills are caused on the sample surface First and a half degree: sixteen or twenty pills are caused on the sample surface First degree: twenty-one or more pills are caused on the sample surface

(10) Abrasion Loss

The same operation as the pilling evaluation was performed to calculate abrasion loss (mg) from the following expression:

Abrasion loss (mg)=the weight before rubbing (mg)−the weight after rubbing (mg);

by using the weights before and after rubbing.

(11) Polyurethane Molecular Weight of Sheet

The sheet was immersed in N,N-dimethylformamide in which lithium chloride was dissolved at a concentration of 0.1 mol/l to extract polyurethane and prepare solution so that the polyurethane concentration was 0.2% by weight. The weight-average molecular weight was calculated from the obtained solution by using gel permeation chromatography (HLC-8020, manufactured by Tosoh Corp).

[Representation of Chemical Substances]

PU: polyurethane

PTMG: polytetramethylene glycol with a number-average molecular weight of 2000

PCL: polycaprolactone with a number-average molecular weight of 2000

PHC: polyhexamethylene carbonate with a number-average molecular weight of 2000

PNMOC: copolymerization polycarbonate diol derived from 1,9-nonanediol with a number-average molecular weight of 2000, represented by the following general formula (3), and 2-methyl-1,8-octanediol

[Chemical formula 5]

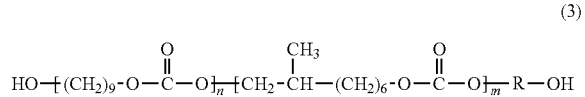

(3)

(in the formula, n and m are positive integers and random copolymerization. R represents an aliphatic hydrocarbon group of either $(CH_2)_9$ or $CH_2$—$CH(CH_3)$—$(CH_2)_6$.)

PHMPC: copolymerization polycarbonate diol derived from 1,6-hexanediol with a number-average molecular weight of 2000, represented by the following general formula (4), and 3-methyl-1,5-pentanediol

[Chemical formula 6]

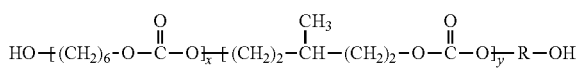

(4)

(in the formula, x and y are positive integers and random copolymerization. R represents an aliphatic hydrocarbon group of either $(CH_2)_6$ or $(CH_2)_2$—$CH(CH_3)$—$(CH_2)_2$.)

MDI: 4,4'-diphenylmethane diisocyanate
EG: ethylene glycol
DMF: N,N-dimethylformamide
PET: polyethylene terephthalate
PVA: polyvinyl alcohol
[Polyurethane Kind]
(1) Polyurethane I (PU-I)
Polyisocyanate: MDI
Polyol: PTMG 70%, PCL 30%
Chain extender: EG
Softening point: 250° C.
Gelation point: 3.1 ml
(2) Polyurethane II (PU-II)
Polyisocyanate: MDI
Polyol: PHC 70%, PCL 30%
Chain extender: EG
Softening point: 210° C.
Gelation point: 7.1 ml
(3) Polyurethane III (PU-III)
Polyisocyanate: MDI
Polyol: PNMOC 60%, PHMPC 40%
Chain extender: EG
Softening point: 250° C.
Gelation point: 3.5 ml
(4) Polyurethane VI (PU-VI)
Polyisocyanate: MDI
Polyol: PHMPC 60%, PCL 20%, PTMG 20%
Chain extender: EG
Softening point: 250° C.
Gelation point: 4.9 ml
(Production of Fibers for Woven or Knitted Material)

Production Example 1

PET with an intrinsic viscosity (IV) of 0.78 and PET with an intrinsic viscosity (IV) of 0.51 were melted separately, discharged from a 12-outlet composite spinneret at a spinning temperature of 295° C. and a composite ratio (% by weight) of 50:50, and taken up at a spinning speed of 1450 m/minute to obtain side-by-side type composite structure undrawn yarn with 12 filaments.

The yarn was drawn at a draw ratio of 2.6 times by using a heated roll-heating plate drawing machine to obtain drawn yarn with 56 dtex and 12 filaments.

Production Example 2

PET with an intrinsic viscosity (IV) of 0.65 was discharged from a 72-outlet spinneret at a spinning temperature of 295° C., and taken up at a spinning speed of 1650 m/minute to obtain undrawn yarn with 72 filaments.

The yarn was drawn at a draw ratio of 2.8 times by using a heated roll-heating plate drawing machine to obtain drawn yarn with 84 dtex and 72 filaments.
(Production of Woven Goods)

Production Example 3

Plain woven material were produced by using as warp yarn twisted yarn such that the drawn yarn obtained in Production Example 1 was twisted by 1500 times/m (a twisting factor of 11200) as warp yarn and using as weft yarn twisted yarn such that the drawn yarn obtained in Production Example 2 was twisted by 2500 times/m (a twisting factor of 22900) as weft yarn.

Production Example 4

Plain woven material were produced by using for both warp yarn and weft yarn twisted yarns such that the drawn yarns obtained in Production Example 1 were made into two folded yarn and twisted by 1800 times/m (a twisting factor of 18900).

Production Example 5

Plain woven material were produced by using for both warp yarn and weft yarn twisted yarns such that the drawn yarns obtained in Production Example 2 were twisted by 2500 times/m (a twisting factor of 22900).

Production Example 6

Plain woven material were produced by using as warp yarn twisted yarn such that the drawn yarn obtained in Production Example 1 was twisted by 1500 times/m (a twisting factor of 11200) and using as weft yarn twisted yarn such that the drawn yarn obtained in Production Example 2 was twisted by 2500 times/m (a twisting factor of 22900).

The obtained woven material were processed at a temperature of 130° C. for 30 minutes by a jet dyeing machine and thereafter dried at a temperature of 130° C. by using a pin tenter to produce woven material with crimp of warp yarn developed.
(Production of Sheet)

Example 1

PET as an island component and polystyrene as a sea component were melted and spun by using a sea-island type composite spinneret with an island number of 36 at a island/sea weight ratio of 55/45, thereafter drawn and crimped, and thereafter cut into 51 mm to obtain raw cotton of a sea-island type composite fiber with a single fiber fineness of 3.1 dtex.

A laminated web was formed through the steps of card and cloth wrapper by using this raw cotton of a sea-island type composite fiber, and needle-punched at a punching number of 600 pieces/cm$^2$, and thereafter the woven material produced in Production Example 3 were inserted above and below the web, needle-punched at a punching number of 2900 pieces/cm$^2$ to stick the web and the woven material together and then to obtain a sheet. This sheet was shrunk by hot water at a temperature of 96° C. and thereafter impregnated into 5%-PVA aqueous solution, and dried by heated air at a temperature of 110° C. for 10 minutes to obtain a sheet such that the PVA weight with respect to the weight of the sheet was 4% by weight. The sea component of this sheet was removed by dissolving in trichloroethylene to obtain a sea component-removed sheet with ultra fine fibers and the woven material entangled. The average single fiber fineness was 0.05 dtex by scanning electron microscope (SEM) observation of the sea component-removed sheet cross section.

This sea component-removed sheet composed of the ultra fine fibers and the woven material was impregnated into DMF solution of polyurethane I prepared for a solid concentration of 12% to coagulate polyurethane in aqueous solution with a DMF concentration of 30%. Thereafter, PVA and DMF were removed by hot water and dried by heated air at a temperature of 110° C. for 10 minutes to obtain a sheet such that the polyurethane weight with respect to the island component weight (the total weight of the ultra fine fibers and the woven material) of the sheet was 20% by weight.

Then, the obtained sheet was cut in half in the thickness direction, and the cut-in-half surface was buffed by endless sandpaper with a sandpaper count of No. 240 to form a napped surface.

The sheet thus obtained was simultaneously shrunk and dyed by a jet dyeing machine under the condition of 130° C., and thereafter dried by a drier to obtain a sheet.

With regard to this sheet, as a result of observing a cavity of the thread in the woven material, it was confirmed that a cavity existed in weft yarn. The obtained sheet had a stretch ratio of 26% and a stretch-back ratio of 95% in the transversal direction, and favorable stretchability in the transversal direction. The sheet exhibited favorable results also in surface appearance grade, touch, pilling evaluation and abrasion loss. In addition, the molecular weight of polyurethane in the sheet was 143000.

Example 2

PET as an island component and polystyrene as a sea component were melted and spun by using a sea-island type composite spinneret with an island number of 16 at a island/sea weight ratio of 80/20, thereafter drawn and crimped, and thereafter cut into 51 mm to obtain raw cotton of a sea-island type composite fiber with a single fiber fineness of 3.8 dtex.

A laminated web was formed through the steps of card and cloth wrapper by using this raw cotton of a sea-island type composite fiber, and needle-punched at a punching number of 300 pieces/cm$^2$, and thereafter the woven material produced in Production Example 4 were inserted above and below the web, needle-punched at a punching number of 3400 pieces/cm$^2$ to stick the web and the woven material together and then to obtain a sheet. This sheet was shrunk by hot water at a temperature of 96° C. and thereafter impregnated into 5%-PVA aqueous solution, and dried by heated air at a temperature of 110° C. for 10 minutes to obtain a sheet such that the PVA weight with respect to the weight of the sheet was 7% by weight. The sea component of this sheet was removed by dissolving in trichloroethylene to obtain a sea component-removed sheet with ultra fine fibers and the woven material entangled. The average single fiber fineness was 0.19 dtex by scanning electron microscope (SEM) observation of the sea component-removed sheet cross section.

This sea component-removed sheet composed of the ultra fine fibers and the woven material was impregnated into DMF solution of polyurethane II prepared for a solid concentration of 12% to coagulate polyurethane in aqueous solution with a DMF concentration of 30%. Thereafter, PVA and DMF were removed by hot water and dried by heated air at a temperature of 110° C. for 10 minutes to obtain a sheet such that the polyurethane weight with respect to the island component weight (the total weight of the ultra fine fibers and the woven material) of the sheet was 31% by weight.

Then, the obtained sheet was cut in half in the thickness direction, and the cut-in-half surface was buffed by endless sandpaper with a sandpaper count of No. 240 to form a napped surface.

The sheet thus obtained was simultaneously shrunk and dyed by a jet dyeing machine under the condition of 130° C., and thereafter dried by a drier to obtain a sheet.

With regard to this sheet, as a result of observing a cavity of the thread in the woven material, it was confirmed that a cavity existed in both warp yarn and weft yarn. The obtained sheet had a stretch ratio of 18% and a stretch-back ratio of 92% in the transversal direction, and a stretch ratio of 18% and a stretch-back ratio of 86% in the longitudinal direction, and favorable stretchability in both the transversal direction and the longitudinal direction. The sheet exhibited favorable results also in surface appearance grade, touch, pilling evaluation and abrasion loss. In addition, the molecular weight of polyurethane in the sheet was 201000.

Example 3

PET as an island component and polystyrene as a sea component were melted and spun by using a sea-island type composite spinneret with an island number of 100 at a island/sea weight ratio of 50/50, thereafter drawn and crimped, and thereafter cut into 51 mm to obtain raw cotton of a sea-island type composite fiber with a single fiber fineness of 4.2 dtex.

A laminated web was formed through the steps of card and cloth wrapper by using this raw cotton of a sea-island type composite fiber, and needle-punched at a punching number of 600 pieces/cm$^2$, and thereafter the woven material produced in Production Example 3 were inserted above and below the web, needle-punched at a punching number of 2900 pieces/cm$^2$ to stick the web and the woven material together and then to obtain a sheet. This sheet was shrunk by hot water at a temperature of 96° C. and thereafter impregnated into 10%-PVA aqueous solution, and dried by heated air at a temperature of 110° C. for 10 minutes to obtain a sheet such that the PVA weight with respect to the weight of the sheet was 21% by weight. The sea component of this sheet was removed by dissolving in trichloroethylene to obtain a sea component-removed sheet with ultra fine fibers and the woven material entangled. The average single fiber fineness was 0.02 dtex by scanning electron microscope (SEM) observation of the sea component-removed sheet cross section.

This sea component-removed sheet composed of the ultra fine fibers and the woven material was impregnated into DMF solution of polyurethane III prepared for a solid concentration of 12% to coagulate polyurethane in aqueous solution with a DMF concentration of 30%. Thereafter, PVA and DMF were removed by hot water and dried by heated air at a temperature of 110° C. for 10 minutes to obtain a sheet such that the polyurethane weight with respect to the island component weight (the total weight of the ultra fine fibers and the woven material) of the sheet was 25% by weight.

Then, the obtained sheet was cut in half in the thickness direction, and the cut-in-half surface was buffed by endless sandpaper with a sandpaper count of No. 240 to form a napped surface.

The sheet thus obtained was simultaneously shrunk and dyed by a jet dyeing machine under the condition of 130° C., and thereafter dried by a drier to obtain a sheet.

With regard to this sheet, as a result of observing a cavity of the thread in the woven material, it was confirmed that a cavity existed in weft yarn. The obtained sheet had a stretch ratio of 32% and a stretch-back ratio of 88% in the transversal direction, and favorable stretchability in the transversal direction. The sheet exhibited favorable results also in surface appearance grade, touch, pilling evaluation and abrasion loss. In addition, the molecular weight of polyurethane in the sheet was 258000.

Example 4

PET as an island component and polystyrene as a sea component were melted and spun by using a sea-island type composite spinneret with an island number of 36 at a island/sea weight ratio of 55/45, thereafter drawn and crimped, and thereafter cut into 51 mm to obtain raw cotton of a sea-island type composite fiber with a single fiber fineness of 3.1 dtex.

A laminated web was formed through the steps of card and cloth wrapper by using this raw cotton of a sea-island type composite fiber, and needle-punched at a punching number of 600 pieces/cm$^2$, and thereafter the woven material produced in Production Example 3 were inserted above and below the web, needle-punched at a punching number of 2900 pieces/cm$^2$ to stick the web and the woven material together and then to obtain a sheet. This sheet was shrunk by hot water at a temperature of 96° C. and thereafter impregnated into 5%-PVA aqueous solution, and dried by heated air at a temperature of 110° C. for 10 minutes to obtain a sheet such that the PVA weight with respect to the weight of the sheet was 5% by weight. Thereafter, the sheet was impregnated into DMF solution of polyurethane I prepared for a solid concentration of 12% to coagulate polyurethane in aqueous solution with a DMF concentration of 30%. Then, DMF was removed by hot water and dried by heated air at a temperature of 110° C. for 10 minutes to obtain a sheet such that the polyurethane weight with respect to the island component weight (the total weight of the ultra fine fibers and the woven material) of the sheet was 22% by weight. The sea component of this sheet was removed by dissolving in trichloroethylene to obtain a sheet composed of the ultra fine fibers, the woven material and polyurethane. The average single fiber fineness was 0.05 dtex by scanning electron microscope (SEM) observation of the sheet cross section.

Then, the obtained sheet was cut in half in the thickness direction, and the cut-in-half surface was buffed by endless sandpaper with a sandpaper count of No. 240 to form a napped surface.

The sheet thus obtained was simultaneously shrunk and dyed by a jet dyeing machine under the condition of 130° C., and thereafter dried by a drier to obtain a sheet.

With regard to this sheet, as a result of observing a cavity of the thread in the woven material, it was confirmed that a cavity existed in weft yarn. The obtained sheet had a stretch ratio of 29% and a stretch-back ratio of 86% in the transversal direction, and favorable stretchability in the transversal direction. The sheet exhibited favorable results also in surface appearance grade, touch, pilling evaluation and abrasion loss. In addition, the molecular weight of polyurethane in the sheet was 147000.

Example 5

A sheet was obtained by performing the same process as Example 1 except for changing the added amount of PVA and the added amount of PU to 5% and 5%, respectively.

With regard to this sheet, as a result of observing a cavity of the thread in the woven material, it was confirmed that a cavity existed in weft yarn. The obtained sheet had poor abrasion resistance but yet stretchability in the transversal direction, and favorable surface appearance grade and touch. In addition, the molecular weight of polyurethane in the sheet was 134000.

Example 6

A sheet was obtained by performing the same process as Example 1 except for cutting a sea-island type composite fiber into 15 mm, and changing the added amount of PVA and the added amount of PU to 5% and 23%, respectively.

With regard to this sheet, as a result of observing a cavity of the thread in the woven material, it was confirmed that a cavity existed in weft yarn. The obtained sheet had many abrasion losses but yet stretchability in the transversal direction, and favorable surface appearance grade, touch and pilling evaluation. In addition, the molecular weight of polyurethane in the sheet was 139000.

Example 7

A sheet was obtained by performing the same process as Example 1 except for providing no PVA and changing the added amount of PU to 14%.

With regard to this sheet, as a result of observing a cavity of the thread in the woven material, it was confirmed that a cavity existed in weft yarn. The obtained sheet had a stretch ratio of 16% and a stretch-back ratio of 97% in the transversal direction, and favorable stretchability in the transversal direction. The sheet exhibited favorable results also in surface appearance grade, touch, pilling evaluation and abrasion loss. In addition, the molecular weight of polyurethane in the sheet was 131000.

Example 8

A sheet was obtained by performing the same process as Example 1 except for changing the added amount of PVA and the added amount of PU to 22% and 38%, respectively.

With regard to this sheet, as a result of observing a cavity of the thread in the woven material, it was confirmed that a cavity existed in weft yarn. The obtained sheet had a stretch ratio of 19% and a stretch-back ratio of 87% in the transversal direction, and favorable stretchability in the transversal direction. The sheet exhibited favorable results also in surface appearance grade, touch, pilling evaluation and abrasion loss. In addition, the molecular weight of polyurethane in the sheet was 149000.

Example 9

A sheet was obtained by performing the same process as Example 1 except for cutting a sea-island type composite fiber into 89 mm, and changing the added amount of PVA and the added amount of PU to 21% and 18%, respectively.

With regard to this sheet, as a result of observing a cavity of the thread in the woven material, it was confirmed that a cavity existed in weft yarn. The obtained sheet had a stretch ratio of 30% and a stretch-back ratio of 88% in the transversal direction, and favorable stretchability in the transversal direction. The sheet exhibited favorable results also in surface appearance grade, touch, pilling evaluation and abrasion loss. In addition, the molecular weight of polyurethane in the sheet was 141000.

Example 10

A sheet was obtained by performing the same process as Example 1 except for changing the added amount of PVA and the added amount of PU to 30% and 25%, respectively.

With regard to this sheet, as a result of observing a cavity of the thread in the woven material, it was confirmed that a cavity existed in weft yarn. The obtained sheet had a stretch ratio of 34% and a stretch-back ratio of 87% in the transversal direction, and favorable stretchability in the transversal direction. In addition, the sheet exhibited somewhat many abrasion losses but yet favorable results in surface appearance grade, touch and pilling evaluation. The molecular weight of polyurethane in the sheet was 139000.

Example 11

A sheet was obtained by performing the same process as Example 1 except for replacing polyurethane I with polyurethane IV, and changing the added amount of PVA and the added amount of PU to 20% and 19%, respectively.

With regard to this sheet, as a result of observing a cavity of the thread in the woven material, it was confirmed that a cavity existed in weft yarn. The obtained sheet had a stretch ratio of 28% and a stretch-back ratio of 90% in the transversal direction, and favorable stretchability in the transversal direction. The sheet exhibited favorable results also in surface appearance grade, touch, pilling evaluation and abrasion loss. In addition, the molecular weight of polyurethane in the sheet was 198000.

Example 12

A sheet was obtained by performing the same process as Example 1 except for changing the added amount of PVA and the added amount of PU to 21% and 44%, respectively.

With regard to this sheet, as a result of observing a cavity of the thread in the woven material, it was confirmed that a cavity existed in weft yarn. The obtained sheet had a stretch ratio of 16% and a stretch-back ratio of 95% in the transversal direction, and favorable stretchability in the transversal direction. The sheet exhibited favorable results also in surface appearance grade, touch, pilling evaluation and abrasion loss. In addition, the molecular weight of polyurethane in the sheet was 151000.

Example 13

A sheet was obtained by performing the same process as Example 1 except for cutting a sea-island type composite fiber into 25 mm, and changing the added amount of PVA and the added amount of PU to 5% and 21%, respectively.

With regard to this sheet, as a result of observing a cavity of the thread in the woven material, it was confirmed that a cavity existed in weft yarn. The obtained sheet had a stretch ratio of 25% and a stretch-back ratio of 95% in the transversal direction, and favorable stretchability in the transversal direction. The sheet exhibited favorable results also in surface appearance grade, touch, pilling evaluation and abrasion loss. In addition, the molecular weight of polyurethane in the sheet was 142000.

Example 14

A sheet was obtained by performing the same process as Example 1 except for cutting a sea-island type composite fiber into 102 mm, and modifying the added amount of PVA and the added amount of PU to 5% and 21%, respectively.

With regard to this sheet, as a result of observing a cavity of the thread in the woven material, it was confirmed that a cavity existed in weft yarn. The obtained sheet had a stretch ratio of 26% and a stretch-back ratio of 94% in the transversal direction, and favorable stretchability in the transversal direction. The sheet exhibited favorable results also in surface appearance grade, touch, pilling evaluation and abrasion loss. In addition, the molecular weight of polyurethane in the sheet was 135000.

Example 15

A sheet was obtained by performing the same process as Example 1 except for replacing polyurethane I with polyurethane II, and changing the added amount of PVA and the added amount of PU to 21% and 25%, respectively.

With regard to this sheet, as a result of observing a cavity of the thread in the woven material, it was confirmed that a cavity existed in weft yarn. The obtained sheet had a stretch ratio of 19% and a stretch-back ratio of 96% in the transversal direction, and favorable stretchability in the transversal direction. The sheet exhibited favorable results also in surface appearance grade, touch, pilling evaluation and abrasion loss. In addition, the molecular weight of polyurethane in the sheet was 205000.

Comparative Example 1

A sheet was obtained by performing the same process as Example 1 except for using the woven material produced in Production Example 5, and changing the added amount of PVA and the added amount of PU into 3% and 19%, respectively.

With regard to this sheet, as a result of observing a cavity of the thread in the woven material, a cavity existed in neither warp yarn nor weft yarn. The obtained sheet exhibited favorable surface appearance grade, touch, pilling evaluation and abrasion loss, but yet had no stretchability. The molecular weight of polyurethane in the sheet was 141000.

Comparative Example 2

A sheet with a napped surface formed was obtained by performing the same process as Example 1 except for using the woven material with crimp developed, which was produced in Production Example 6, and changing the added amount of PVA and the added amount of PU to 6% and 22%, respectively. The sheet thus obtained was dyed by a jet dyeing machine under the condition of 130° C., and thereafter dried by a drier to obtain a sheet.

With regard to this sheet, as a result of observing a cavity of the thread in the woven material, a cavity existed in neither warp yarn nor weft yarn. The obtained sheet exhibited favorable touch and abrasion loss, but yet somewhat poor pilling evaluation, and had no stretchability. The fibers of the woven material were exposed to the product surface, so that the grade was very poor. The molecular weight of polyurethane in the sheet was 142000.

The conditions and results of Examples and Comparative Examples are shown together in Tables 1 to 3.

TABLE 1

| | Woven material weft yarn | | | Woven material warp yarn | | | |
|---|---|---|---|---|---|---|---|
| | Thread kind | Number of twist (times/m) | Crimping factor | Thread kind | Number of twist (times/m) | Crimping factor | Crimp development |
| Production Example 3 | Production Example 1 | 1500 | 11200 | Production Example 2 | 2500 | 22900 | Absent |
| Production Example 4 | Production Example 1 into two folded yarn | 1800 | 18900 | Production Example 1 into two folded yarn | 1800 | 18900 | Absent |
| Production Example 5 | Production Example 2 | 2500 | 22900 | Production Example 2 | 2500 | 22900 | Absent |
| Production Example 6 | Production Example 1 | 1500 | 11200 | Production Example 2 | 2500 | 22900 | Present |

TABLE 2

| | Ultra fine fibers | | | PVA added | | PU added | Timing of sea |
|---|---|---|---|---|---|---|---|
| | Fineness (dtex) | Fiber length (mm) | Kind of Woven material | amount (wt. %) | PU kind | amount (wt. %) | component dissolution |
| Example 1 | 0.05 | 51 | Production Example 3 (woven material having composite fiber as weft yarn) | 4 | PU-I | 20 | Before impregnating |
| Example 2 | 0.19 | 51 | Production Example 4 (woven material having composite fiber as weft yarn and warp yarn) | 7 | PU-II | 31 | Before impregnating |
| Example 3 | 0.02 | 51 | Production Example 3 (woven material having composite fiber as weft yarn) | 21 | PU-III | 25 | Before impregnating |
| Example 4 | 0.05 | 51 | Production Example 3 (woven material having composite fiber as weft yarn) | 5 | PU-I | 22 | after impregnating |
| Example 5 | 0.05 | 51 | Production Example 3 (woven material having composite fiber as weft yarn) | 5 | PU-I | 5 | Before impregnating |
| Example 6 | 0.05 | 15 | Production Example 3 (woven material having composite fiber as weft yarn) | 5 | PU-I | 23 | Before impregnating |
| Example 7 | 0.05 | 51 | Production Example 3 (woven material having composite fiber as weft yarn) | 0 | PU-I | 14 | Before impregnating |
| Example 8 | 0.05 | 51 | Production Example 3 (woven material having composite fiber as weft yarn) | 22 | PU-I | 38 | Before impregnating |
| Example 9 | 0.05 | 89 | Production Example 3 (woven material having composite fiber as weft yarn) | 21 | PU-I | 18 | Before impregnating |
| Example 10 | 0.05 | 51 | Production Example 3 (woven material having composite fiber as weft yarn) | 30 | PU-I | 25 | Before impregnating |
| Example 11 | 0.05 | 51 | Production Example 3 (woven material having composite fiber as weft yarn) | 20 | PU-IV | 19 | Before impregnating |
| Example 12 | 0.05 | 51 | Production Example 3 (woven material having composite fiber as weft yarn) | 21 | PU-I | 44 | Before impregnating |
| Example 13 | 0.05 | 25 | Production Example 3 (woven material having composite fiber as weft yarn) | 5 | PU-I | 21 | Before impregnating |
| Example 14 | 0.05 | 102 | Production Example 3 (woven material having composite fiber as weft yarn) | 5 | PU-I | 21 | Before impregnating |
| Example 15 | 0.05 | 51 | Production Example 3 (woven material having composite fiber as weft yarn) | 21 | PU-II | 25 | Before impregnating |
| Comparative Example 1 | 0.05 | 51 | Production Example 5 (ordinary woven material) | 3 | PU-I | 19 | Before impregnating |
| Comparative Example 2 | 0.05 | 51 | Production Example 6 (woven materila having composite fiber as weft yarn (after | 6 | PU-I | 22 | Before impregnating |

TABLE 3

|  | Cavity of composite fibers | Stretchability | | | | | | | Surface appearance grade | Touch | Pilling evaluation (degree) | Abrasion loss (mg) | PU molecular weight in the sheet |
|---|---|---|---|---|---|---|---|---|---|---|---|---|---|
|  |  | Stretch ratio | | Stretch-back ratio | | Evaluation | | | | | | | |
|  |  | Transversal | Longitudinal | Transversal | Longitudinal | Transversal | Longitudinal | General | | | | | |
| Example 1 | Present | 26 | 5 | 95 | 92 | P | F | P | A | B | 4.5 | 2.1 | 143000 |
| Example 2 | Present | 18 | 18 | 92 | 86 | P | P | P | A | B | 4.5 | 4.5 | 201000 |
| Example 3 | Present | 32 | 11 | 88 | 91 | P | F | P | A | A | 4.5 | 7.9 | 258000 |
| Example 4 | Present | 29 | 11 | 86 | 88 | P | F | P | B | B | 3.5 | 9.8 | 147000 |
| Example 5 | Present | 27 | 10 | 95 | 92 | P | F | P | B | A | 1 | 12.1 | 134000 |
| Example 6 | Present | 26 | 7 | 85 | 92 | P | F | P | A | B | 4.5 | 16.2 | 139000 |
| Example 7 | Present | 16 | 3 | 97 | 96 | P | F | P | A | B | 4.5 | 1.9 | 131000 |
| Example 8 | Present | 19 | 6 | 87 | 93 | P | F | P | A | A | 4.5 | 5.1 | 149000 |
| Example 9 | Present | 30 | 10 | 88 | 90 | P | F | P | B | A | 4.5 | 1.7 | 141000 |
| Example 10 | Present | 34 | 13 | 87 | 91 | P | F | P | A | A | 3.5 | 11.3 | 139000 |
| Example 11 | Present | 28 | 9 | 90 | 90 | P | F | P | A | A | 4.5 | 8.1 | 198000 |
| Example 12 | Present | 16 | 5 | 95 | 95 | P | F | P | A | B | 4.5 | 3.9 | 151000 |
| Example 13 | Present | 25 | 5 | 95 | 93 | P | F | P | A | B | 4.5 | 9.7 | 142000 |
| Example 14 | Present | 26 | 4 | 94 | 92 | P | F | P | B | B | 4.5 | 1.8 | 135000 |
| Example 15 | Present | 19 | 6 | 96 | 94 | P | F | P | A | B | 4.5 | 5.1 | 205000 |
| Comparative Example 1 | Absent | 11 | 4 | 82 | 93 | F | F | F | B | B | 4.5 | 1.9 | 141000 |
| Comparative Example 2 | Absent | 21 | 9 | 73 | 95 | F | F | F | C | B | 3.5 | 5.5 | 142000 |

The invention claimed is:

1. A stretch sheet including woven or knitted material including thread composed of a composite fiber such that two kinds or more of polyethylene terephthalate polymers different in intrinsic viscosity are stuck together in a side-by-side type along the fiber length direction and/or of a core-in-sheath type composite fiber such that two kinds or more of polyethylene terephthalate polymers different in intrinsic viscosity form an eccentric core-in-sheath structure, an ultra fine fiber with an average single fiber fineness of 0.001 dtex or more and 0.5 dtex or less, and an elastomer having polyurethane as a main component, in which the thread composing woven or knitted material has a structure having a cavity in its inside, wherein the cavity is formed by heating under a condition of 110° C. or more,
    wherein the elastomer is partially joined to the thread having a cavity when being joined to the thread and a gelation point of the polyurethane is 2.5 ml or more and 6 ml or less, and a softening point of the polyurethane is greater than 240° and 300° C. or less;
    wherein a napped surface is formed; and
    wherein the content of the polyurethane is 10% by weight or more and 40% by weight or less with respect to the total weight of the ultra fine fiber and the woven or knitted material.

2. The stretch sheet according to claim 1, wherein the softening point of the polyurethane is greater than 250° C. and 300° C. or less.

3. The stretch sheet according to claim 1, in which stretch ratio in a longitudinal direction and/or a transversal direction is 15% or more and 35% or less, and a stretch-back ratio in the longitudinal direction and/or the transversal direction is 80% or more and 100% or less.

4. The stretch sheet according to claim 1, in which the polyurethane is polycarbonate polyurethane having a polycarbonate skeleton represented by the following general formulae (1) and (2):

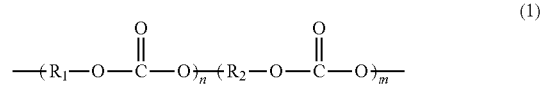

(1)

wherein, $R_1$ and $R_2$ are aliphatic hydrocarbon groups with a carbon number of 7 to 11, and may be same or different; n and m are positive integers; and $R_1$ and $R_2$ are block copolymerization or random copolymerization in the case of being different;

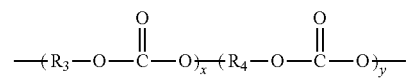

(2)

wherein, $R_3$ and $R_4$ are aliphatic hydrocarbon groups with a carbon number of 3 to 6, and may be same or different; x and y are positive integers and $R_3$ and $R_4$ are block copolymerization or random copolymerization in the case of being different.

5. The stretch sheet according to claim 1, in which the fiber length of the ultra fine fiber is 25 mm or more and 90 mm or less.

6. A method for producing the stretch sheet according to claim 1, including the following steps (i) to (iii) in this order:
    (i) producing a sheet by entangling woven or knitted material including the thread composed of the two kinds or more of polyethylene terephthalate polymers, with a fiber capable of converting into ultra fine fibers composed of two kinds or more of polymeric substances different in solubility in solvent;
    (ii) developing the ultra fine fiber by treating the sheet with a solvent to thereafter provide the elastomer having polyurethane as a main component by impregnating and solidifying a solvent solution of elastomer having polyurethane as a main component into the sheet, or of providing an elastomer having polyurethane as a main component by impregnating and solidifying a solvent solution of elastomer having polyurethane as a main component into the sheet to thereafter develop the ultra fine fiber with an average single fiber fineness of 0.001 dtex or more and 0.5 dtex or less by treating the sheet with a solvent; and
    (iii) rubbing and shrinking the woven or knitted material under the condition of 110° C. or more.

7. The method for producing a stretch sheet according to claim 6, in which elastomer having polyurethane as a main component is provided after developing an ultra fine fiber in step (ii).

8. The method for producing a stretch sheet according to claim 7, in which a water-soluble resin is provided to the sheet before step (ii).

* * * * *